Feb. 25, 1958 J. W. WINSHIP ET AL 2,824,347
MOLDING MACHINE
Filed Nov. 21, 1952 13 Sheets-Sheet 1

INVENTORS.
Raymond C. Schumacher and
James W. Winship.
BY
Brown, Critchlow, Flick & Peckham
THEIR ATTORNEYS:-

Feb. 25, 1958   J. W. WINSHIP ET AL   2,824,347
MOLDING MACHINE

Filed Nov. 21, 1952   13 Sheets-Sheet 2

INVENTORS.
Raymond C. Schumacher and
James W. Winship.
BY
Brown, Critchlow, Flick & Peckham
THEIR ATTORNEYS:-

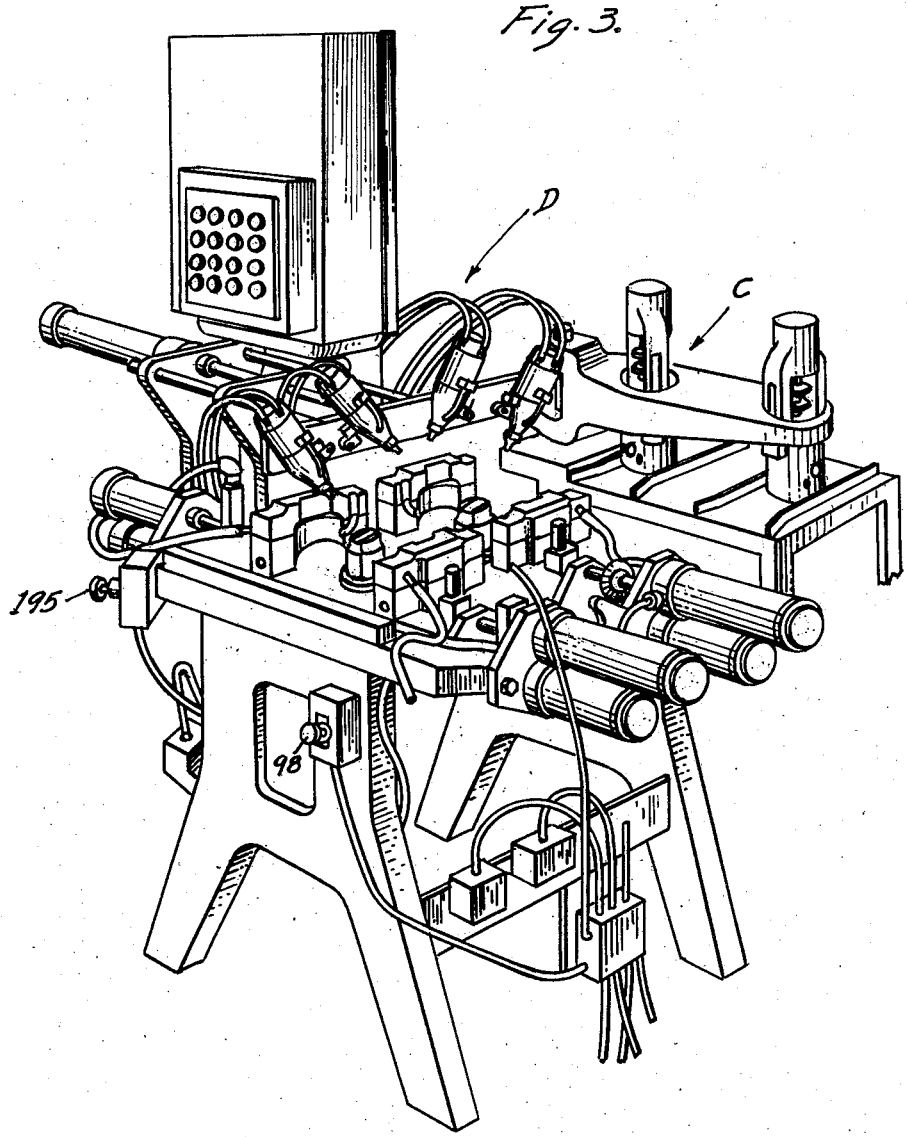

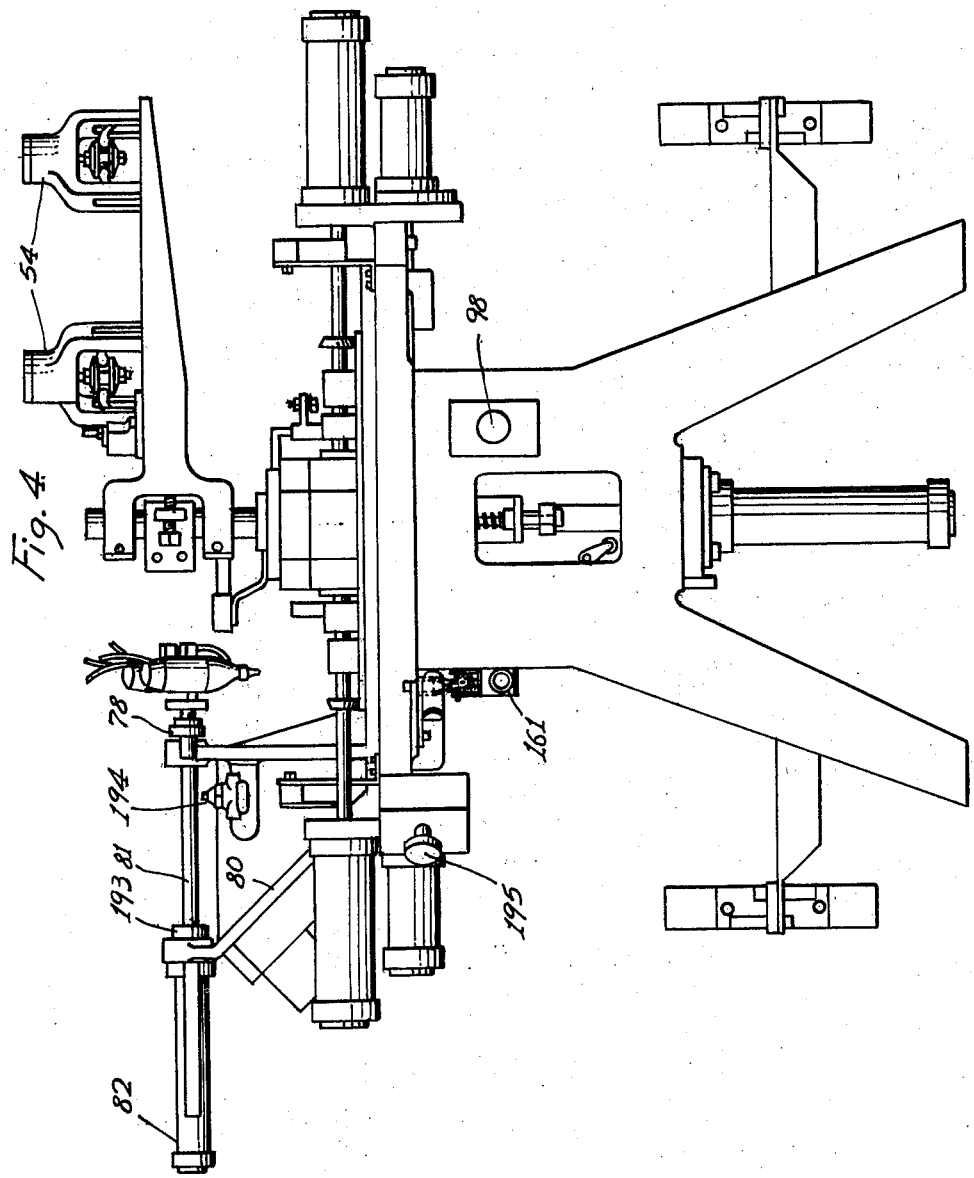

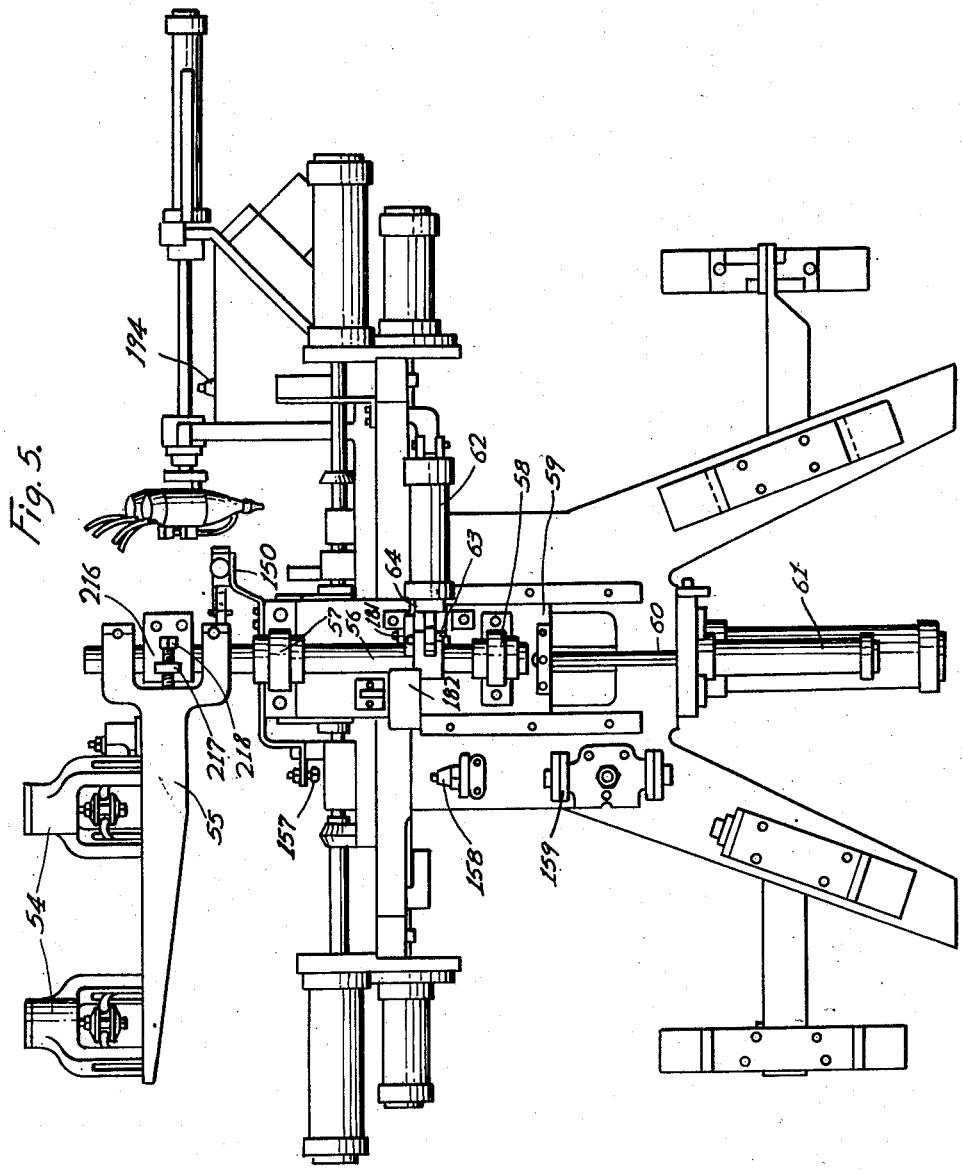

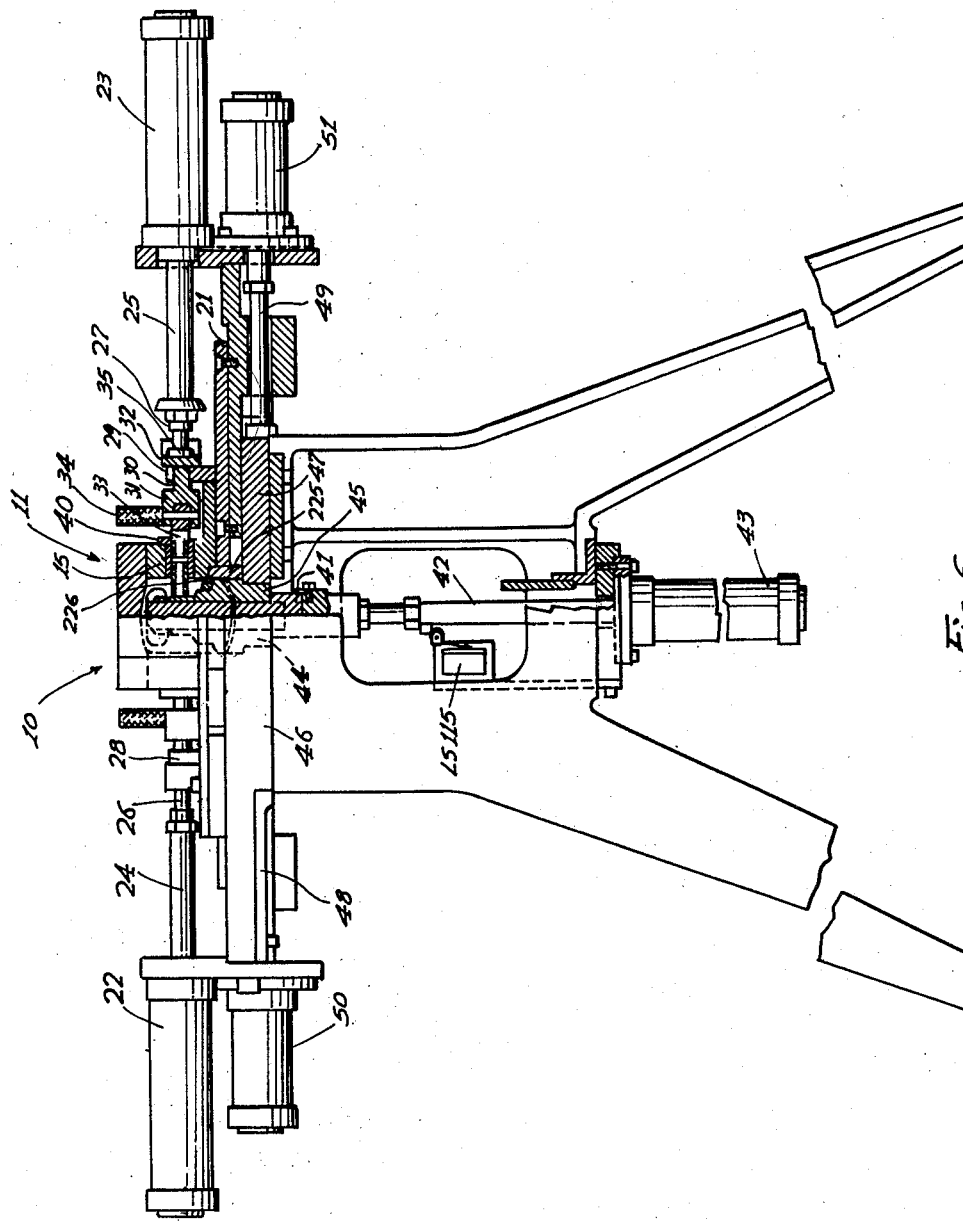

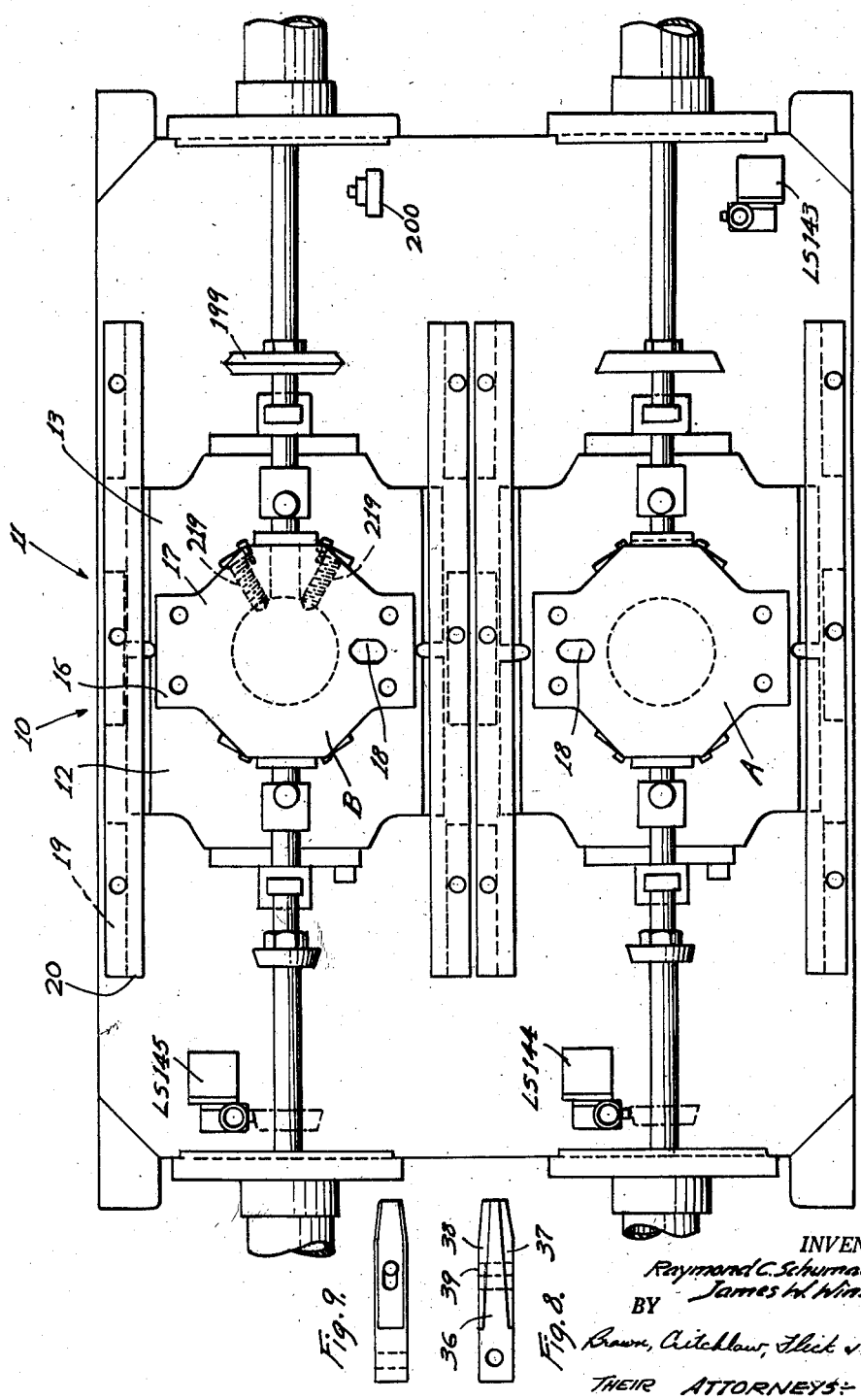

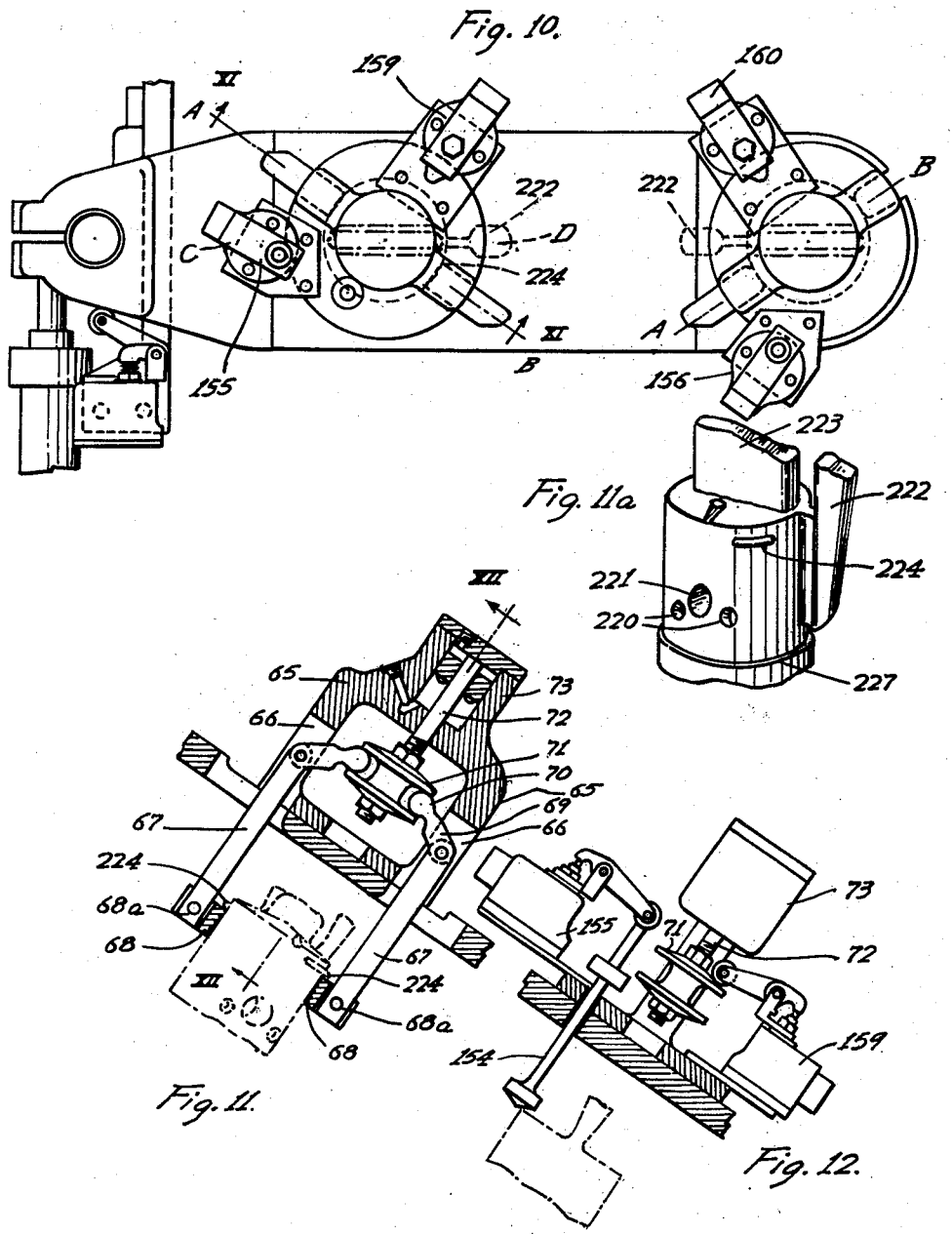

Feb. 25, 1958  J. W. WINSHIP ET AL  2,824,347
MOLDING MACHINE
Filed Nov. 21, 1952  13 Sheets-Sheet 11

INVENTORS.
Raymond C. Schumacher And
James W. Winship.
BY
Brown, Critchlow, Flick & Peckham
THEIR ATTORNEYS:-

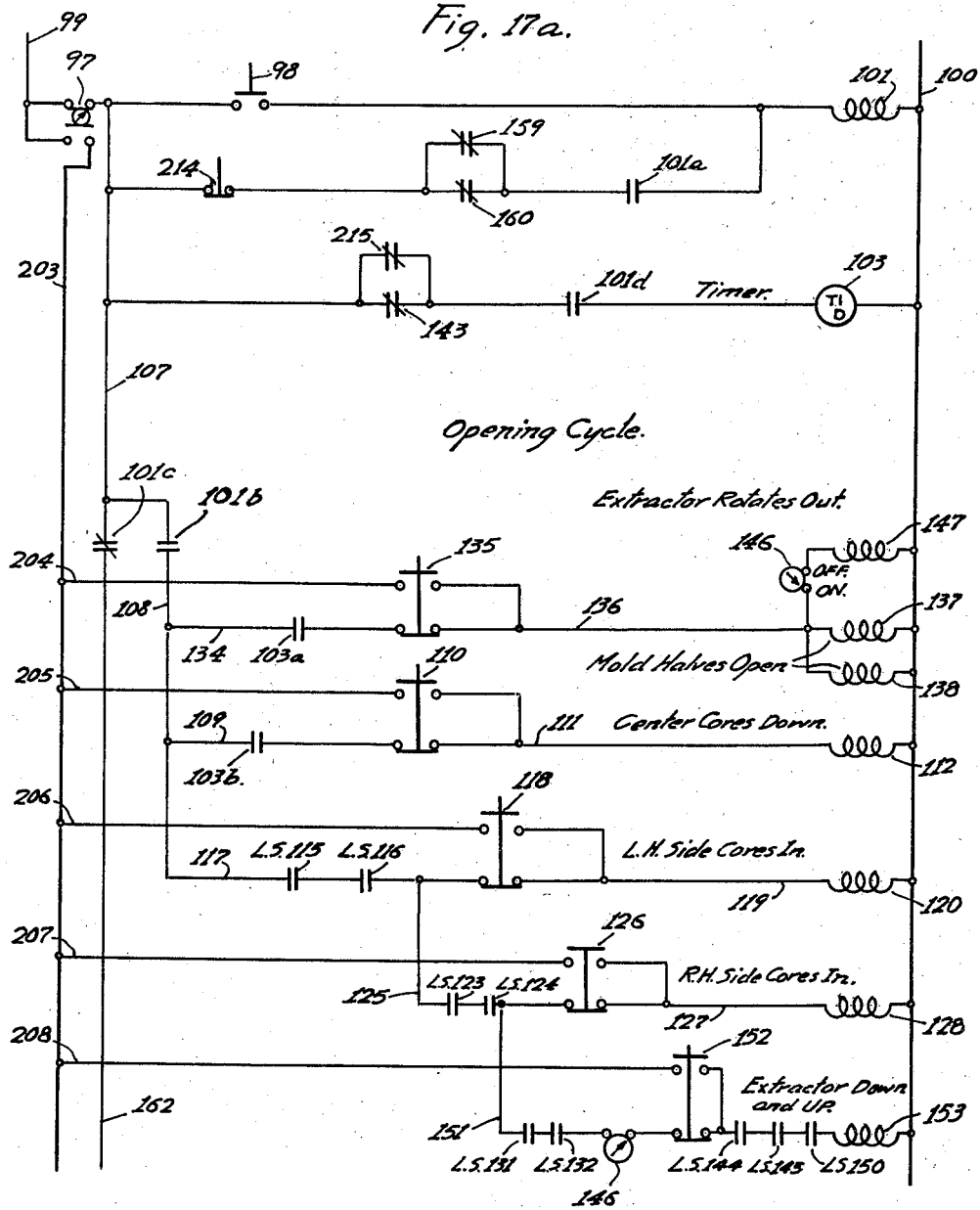

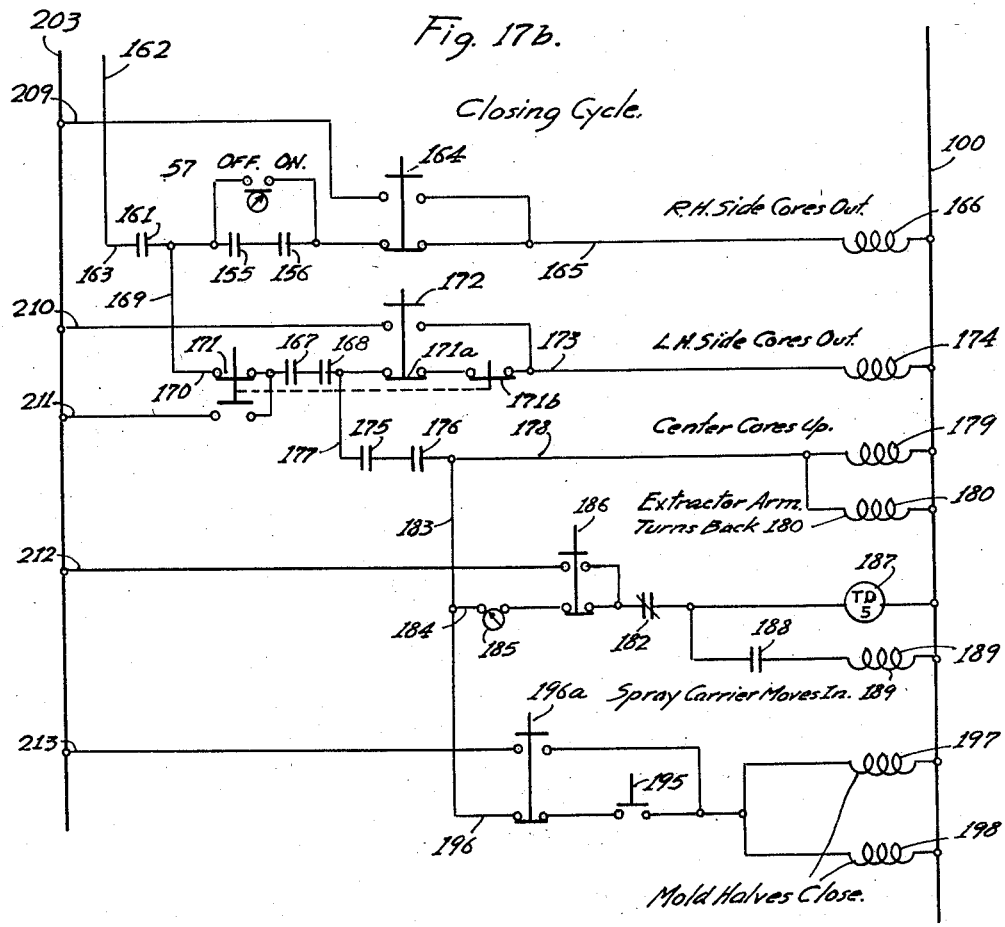

United States Patent Office 2,824,347
Patented Feb. 25, 1958

2,824,347

MOLDING MACHINE

James W. Winship, Lake Orion, and Raymond C. Schumacher, Detroit, Mich., assignors to Bohn Aluminum & Brass Corporation, a corporation of Michigan Application November 21, 1952, Serial No. 321,794

5 Claims. (Cl. 22—93)

The present invention relates to a machine for molding hollow articles such as pistons for internal combustion engines.

The machine includes two identical molds of the permanent type, that is, made entirely of metal, and all parts of the mold are moved mechanically from a "closed" or molding position to an "open" or extracting position. The pistons are normally cast of an aluminum alloy, or similar metal.

A particular feature of novelty resides in the construction of the core pins, which form the openings for the wrist pin in the piston casting. Those core pins are made sectional and are so arranged that when the center section is pulled outwardly the side sections collapse inwardly to move away from the wall of the wrist pin bores.

Another feature of the machine is the provision of an extractor mechanism, which is mounted on a vertical shaft for rotary and vertical movement. This extractor provides a positive mechanical device for removing the castings from the molds and after it has extracted the castings, the extractor swings back to a "discharge" position at the rear of the machine where it does not interfere with access to the molds.

The machine also provides an efficient arrangement of sprays to cool the core assemblies between the casting operations.

The machine includes provision for cooling the mold halves and the mold caps.

Automatic means is provided to cause sequentially the following operations: to time a period in which the metal sets, to open the mold halves, to collapse the cores, to remove the castings, to reassemble the core assemblies, and to cool the core assemblies. At this point the machine stops to permit the operator to place steel struts on the core assemblies. After placing the struts the operator manually starts another automatic sequence which causes the molds to close.

These and other objects and advantages of the invention will become apparent as the description proceeds.

The machine of the present invention is an improvement on the machine disclosed in Patent No. 2,581,418 to Kohl which issued January 8, 1952. The features of improvement over this patent will become apparent in connection with the following detailed description.

In the drawings:

Fig. 3 is a perspective showing the core assemblies exposed and the spray carrier in spraying position.

Fig. 4 is an elevation of the front of the machine.

Fig. 5 is an elevation of the rear of the machine.

Fig. 6 is a view partly in elevation and partly in sections showing details of the molds.

Fig. 7 is a plan view showing details of the molds.

Fig. 8 is a side elevation of a core pin.

Fig. 9 is a plan view of a core pin.

Fig. 10 is a plan view of the extractor arm.

Fig. 11 is a cross section through one of the extractor heads.

Fig. 11a is a perspective of a piston casting produced by the machine.

Fig. 12 is a detail, partly in section, of one of the extractor heads.

Figs. 17a and 17b are two related figures illustrating diagrammatically the electrical controls.

Figure 1:
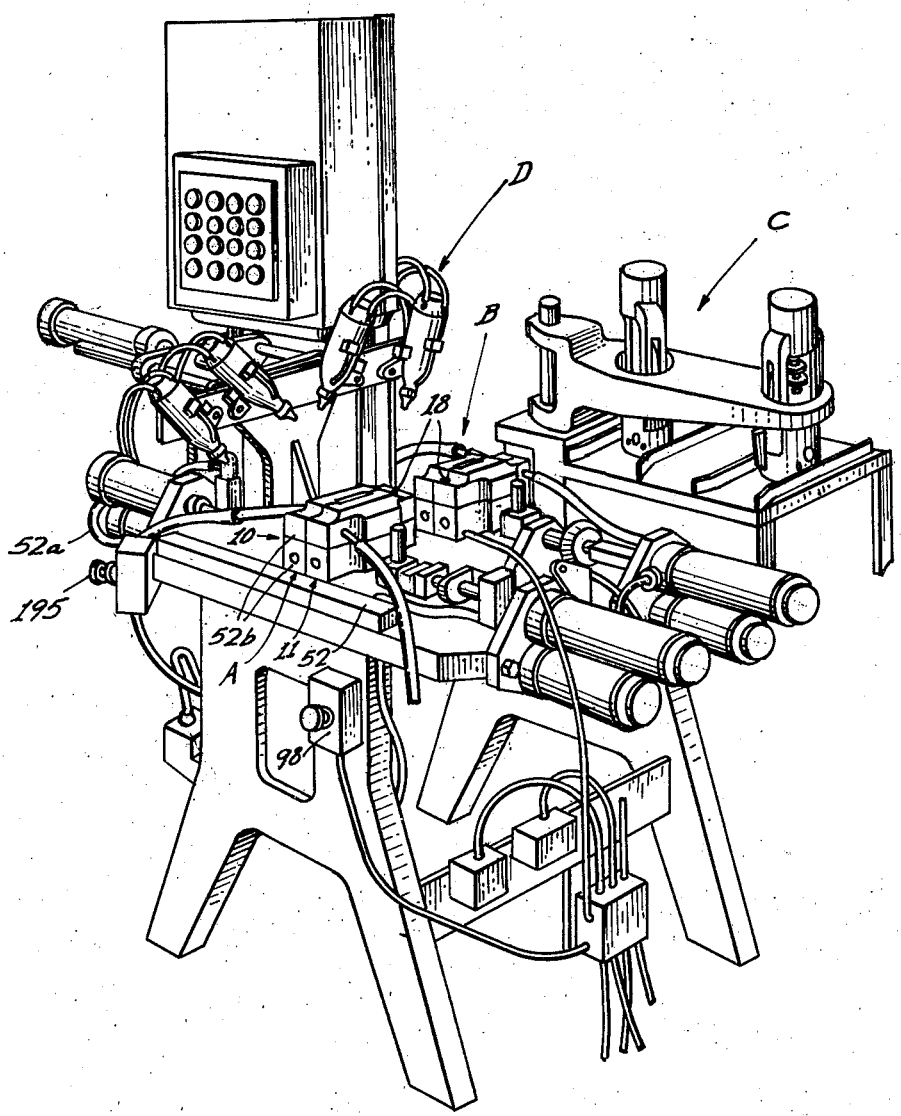
Fig. 1 is a general perspective view of the machine with the parts in "molding" position, ready to receive molten metal.
Figure 2:
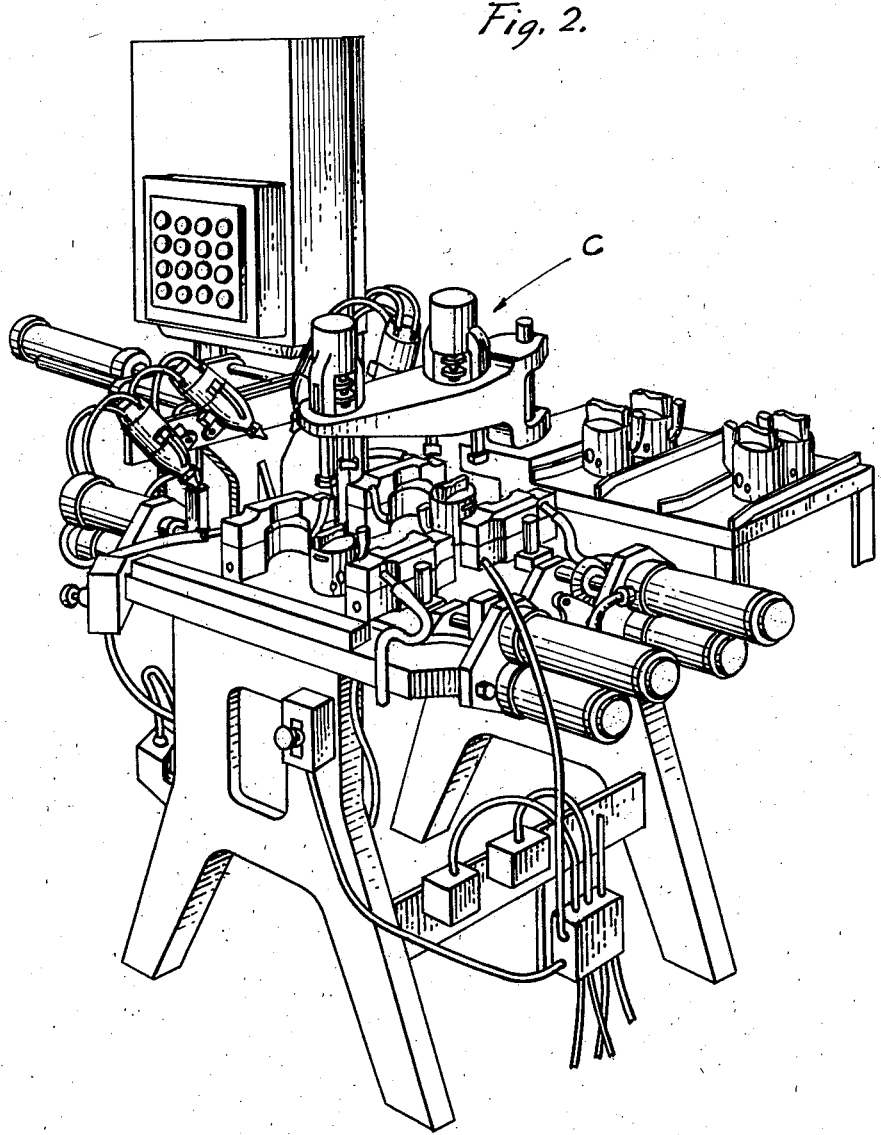
Fig. 2 is a view similar to Fig. 1 but showing the parts after the mold halves have opened and the extractor is ready to remove the castings from the machine.

I. GENERAL DESCRIPTION (Figs. 1, 2 and 3)

In a general way the machine includes two identical molds, A and B, mounted on a work table carried by a suitable framework.

The extractor C is mounted on a vertical shaft at the rear of the machine. When the molds are being poured the extractor is in its discharging position at the rear of the machine, as shown in Fig. 1. After the molds have opened and the cores have collapsed, the castings are ready to be removed. The extractor then swings in to the extracting position directly over the molds, as shown in Fig. 2. The extractor next moves down, picks up the castings, and returns to the discharging position of Fig. 1.

After the cores have been re-assembled to their casting position, the spray heads, indicated generally at D, then move in to a spraying position over the cores and apply a cooling spray to reduce the temperature of the cores before the next casting operation. (See Fig. 3.)

The machine includes mechanical means for moving these parts, and control devices that permit their operation by either manual (each operation separately initiated), or semi-automatic sequencing.

II. INDIVIDUAL MOLDS

Since the two molds, A and B, are identical in construction only one of them will be described in detail, as shown especially in Figs. 1, 3, 5 and 7.

Mold-halves

Each of the molds includes a left-hand mold half indicated generally (see Fig. 7) by the numeral 10, and a right-hand mold half indicated generally by the numeral 11. The left-hand mold half includes a flat slide plate 12 carrying an upstanding mold block 14, and a head block or cap 16 which is removably mounted on the top of the mold block 14.

The right-hand mold half 11 similarly consists of a slide plate 13, an upstanding mold block 15 and a head block 17. The interior surfaces of these parts are of such shape that when they are assembled together in molding position they define the exterior of the piston being molded.

Each of the head blocks 16 and 17 is formed with a notch or cut-out, these two notches cooperating to form a pouring opening 18 through which molten metal is introduced into the mold. See Figs. 1 and 7.

In order to keep the molds at a desired temperature, a cooling fluid may be introduced by supply lines 52 to internal cavities formed in the head blocks 16 and 17. Similarly, cooling fluid may be supplied to cavities in the mold halves by supply lines 52a. In case the cooling fluid used is air, it may be permitted to escape to the atmosphere, as through the openings 52b. If a liquid coolant is used, it is necessary to attach return lines to the openings 52b.

The two mold halves are movable inwardly to a "closed" or molding position in which they contact each other to define the outer wall of the mold, and outwardly to an "open" or extracting position. During the motion toward and away from each other, the mold halves are accurately guided by gibs 19 provided with overhanging flanges 20 and by central guide keys 21. See Fig. 7.

The left-hand mold half (Fig. 6) is moved by hydraulic cylinder 22 which operates a piston rod 24 connected to an operating rod 26.

Similarly, hydraulic cylinder 23 operates the right-hand mold half through a piston rod 25 connected to an operating rod 27.

Upstanding traction plates 28 and 29 are fastened to the outer ends of the slide plates 12 and 13 respectively, and the operating rods operate the mold halves through a lost-motion connection to these traction plates. This lost-motion connection will now be described, referring particularly to the right-hand side of Fig. 6.

A push-pull rod 30 sets into a U-shaped notch formed in the upper surface of the traction plate 29, and carries at its inner end a yoke 31 and at its outer end a yoke 32. The inner side of yoke 31 is provided with a socket in which the core pin 33 is held by means of a hand pin 34. The inner end of operating rod 27 has an enlarged head 35 which fits into a socket formed in the outer yoke 32. The upper side of the socket is open so that the head may be lifted up to disengage it from the yoke 32. The surfaces of yokes 31 and 32 which face the traction plate 29 alternately engage the plate to push or pull the mold half and these yokes are spaced apart a greater distance than the thickness of plate 29 in order to provide the desired amount of lost motion.

Core pins

The core pin 33 projects through the side wall of the mold half and its inner end meets the center core. The core pin defines the inner bore of the wrist pin boss. Each core pin 33, as shown in greater detail in Figs. 8 and 9, includes a central tapered section 36 and two outer complementary tapered side sections 37 and 38. The outer portions 37 and 38 are held in position by core pin bushing 40. A pin 39 is fixed in the central portion 36 and engages in elongated slots in the outer portions 37 and 38. The core pin slides in a core pin bushing 40 mounted in a side wall of the mold half.

The parts are so designed that when the piston rod 25 moves outwardly from the position illustrated in Fig. 6 the first part of the motion pulls outwardly on the push-pull rod 30 which in turn pulls outwardly the central section 36 of the core pin, and this motion causes the outer sections 37 and 38 to slide down the tapered portion of the central section and collapse inwardly away from the wall of the wrist pin boss. After the central section has moved outwardly to the extent permitted by the elongated slots the pin 39 engages in the end of the elongated slots and the outer portions 37 and 38 now slide along with the central section 36. At this point the outer face of yoke 31 engages the traction plate 29 and the entire mold half 11 now moves outwardly to its outer or "extracting" position.

By providing the core pin with outer sections which are positively pulled inwardly away from the wall of the bore in the wrist pin boss, the core pin is freed from the boss without danger of sticking to the freshly cast metal.

It should be understood that the core pin and operating mechanism for the left-hand mold half 10 is similar to that just described in connection with the right-hand mold half 11.

Cores

The core which defines the internal cavity in the piston is also made of metal. Since the piston usually has a bulbous cavity which projects outwardly over the wrist pin bosses, the core is formed in three or more sections so that after the center core section has been moved down out of the mold the two side cores may be moved inwardly or "collapsed" toward each other, so as to reduce their combined outer size to a dimension that will pass between the inner ends of the wrist pin bosses. Since the construction of these core parts is not new with the present applicants they will be described only in a very general way.

The center core 41 (Fig. 6) is pulled down out of the mold by a piston rod 42 operated by center-core cylinder 43.

The left-hand side core 44 is immovably attached to the left-hand core slide 46 which is moved by piston rod 48 connected to left-hand side core cylinder 50. Similarly, the right-hand side core 45 is immovably connected to right-hand core slide 47, which is moved by right-hand piston rod 49 of the right-hand side core cylinder 51.

It will be clear from Fig. 6 that after the center core has been pulled downwardly out of the mold cavity and the two side cores have been collapsed inwardly into contact with each other, the side cores will clear the projections for the wrist pin bosses and the casting may then be lifted up and removed from the machine.

Figure 13:
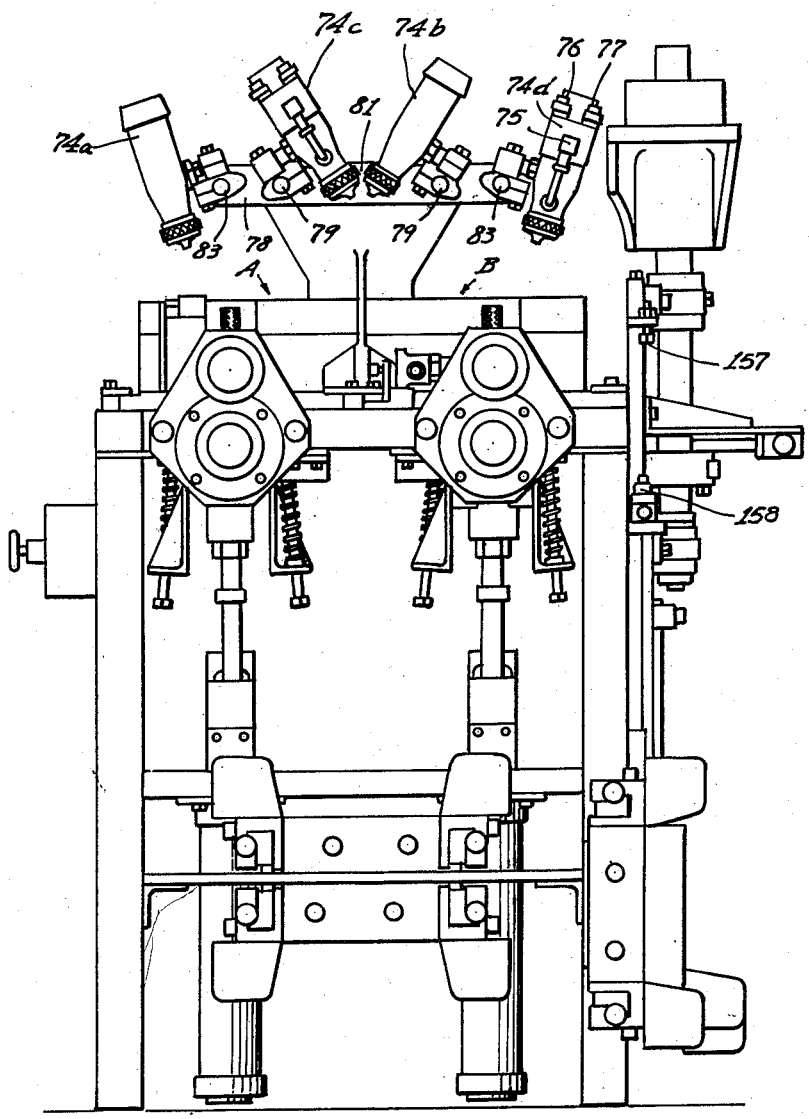
Fig. 13 is an elevation of the machine as viewed from the right end, showing especially the spray mechanism.
Figure 14:
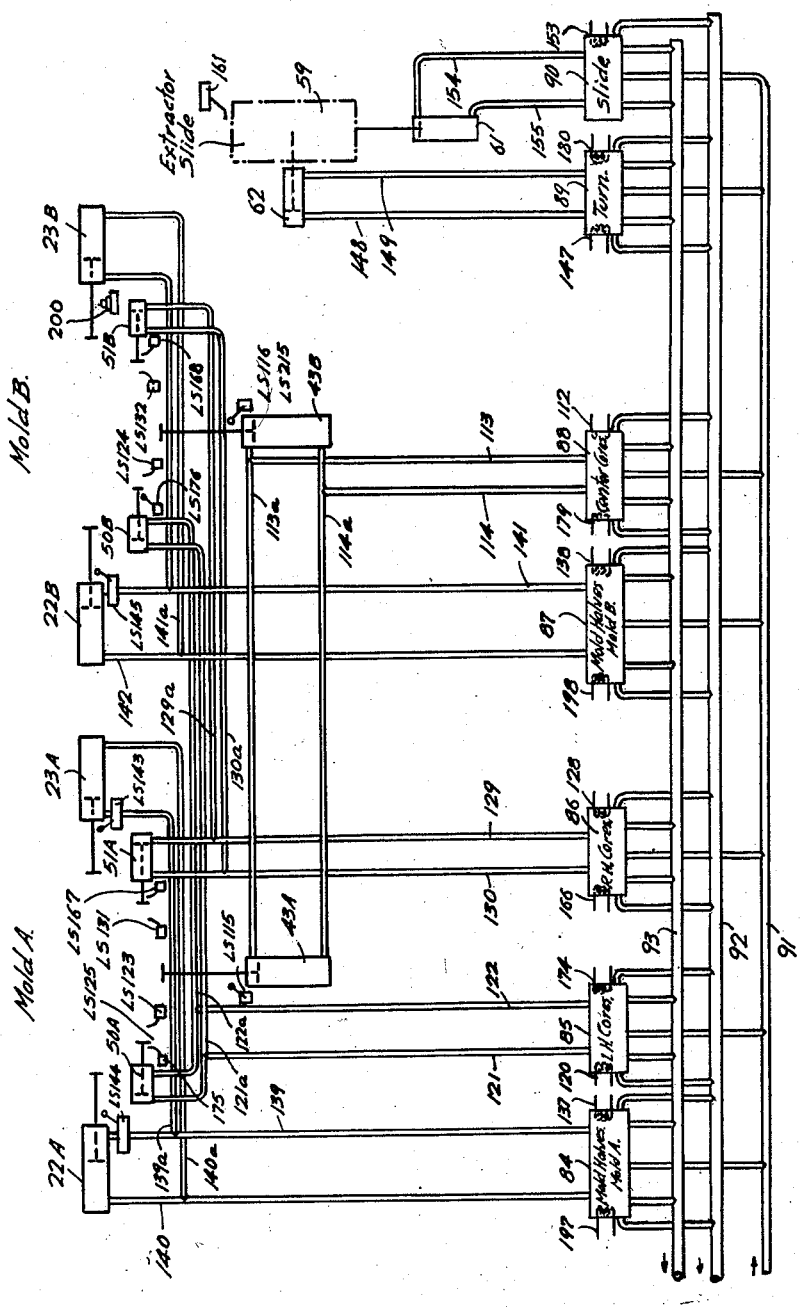
Fig. 14 is a diagram illustrating the hydraulic operating system.

When the machine is to be used to cast strut pistons, such as the one illustrated in Figs. 13 and 14 of Nelson Patent No. 2,086,677, the side cores should be provided with means for positioning and holding the steel struts. The positioning means may include pins carried by the side cores and closely fitting into holes in the struts. The holding means may include permanent magnets set into the side cores at points where they will be in contact with the steel struts.

The steel struts must be pressed against the side cores by projections carried by the mold halves. In case the piston design is such that parts of the struts are exposed, as in Fig. 8 of Patent 2,086,677, portions of the mold halves will contact the struts at the parts that are to be exposed. But if the piston design provides an arcuate wall covering the strut, then strut support pins 219 (see Fig. 7) pass through the mold halves to press the struts against the side cores. These strut support pins leave openings 220 (see Fig. 11a) in the side wall of the piston.

A rough casting produced by the machine is illustrated in Fig. 11a. The openings 220 are formed by the strut support pins as previously described, and the openings 221 are the openings for the wrist pin. Numeral 222 indicates the "gate," metal which solidified in the pouring gate, and numeral 223 indicates the "riser," metal which solidified in a cavity provided above the head of the piston.

Numerals 224 indicate a pair of lifting lugs which are provided on opposite sides of the casting. (See Figs. 10, 11 and 11a.) The lugs 224 are provided for engagement with the grippers 68, and their presence permits the grippers to engage the hot and relatively soft casting with only moderate pressure. If the lugs 224 are not present, the pressure on grippers 68 needed to avoid occasional slipping must be so high as to distort the casting.

It will be seen from Fig. 10 that these lugs 224 are located at the ends of an axis A—B, which is angularly displaced from the axis C—D which passes through the center line of the castings on which the gates 222 are located. It is also clear from Fig. 10 that the axis A—B of the left-hand casting has its end adjacent gate 222 tilted 35° from axis C—D and the axis A—B of the right-hand casting similarly has its end adjacent gate 222 tilted 35° from axis C—D. The extractor heads are disposed so as to have their gripping fingers 67 move inwardly and outwardly along the axis A—B.

By arranging the axis A—B at the angles indicated, the fingers 67 can grip the castings without any interference from the gates 222, and after the castings have been deposited on the chutes, the opened fingers 67 can be swung forward past the castings without hitting the gates 222 or any other part of the casting.

III. EXTRACTOR

The extractor mechanism, which is indicated generally by the letter C in Fig. 2, includes extractor heads 54 (Fig. 5) mounted on an extractor arm 55 which is carried by a vertical shaft 56. Shaft 56 is mounted to rotate in pillow blocks 57 and 58 carried by a slide 59, which is moved vertically by push-rod 60 actuated by hydraulic cylinder 61. The cylinder 61 slides the extractor arm from a lowered position in which it is in contact with the casting to a raised position in which it clears the mold halves.

Rotation of shaft 56 is caused by hydraulic cylinder 62 which moves lever arm 63 keyed to the shaft. The opposite end of hydraulic cylinder 62 is pivotally attached to bracket arm 64 mounted on slide 59. The cylinder 62 causes the extractor arm to rotate from the extracting position directly over the molds (Fig. 2) to a discharging position at the rear of the machine (Fig. 1) where it is out of the way and does not interfere with easy access to the molds.

Means is provided to accurately adjust the angular position of extractor arm 55 relative to shaft 56 in order to insure that the extractor heads are accurately centered over the castings. The adjusting means includes a sleeve 216, which is non-rotatably clamped to shaft 56 and carries two opposite outstanding lugs 217. An adjusting screw 218 is threaded through each of the lugs 217 and engages one side of arm 55. The operation of these two adjusting screws will be obvious to those skilled in the art.

Extractor heads

The extractor heads are shown in greater detail in Figs. 10, 11 and 12. As illustrated each of the extractor heads include two upright support arms 65, the lower ends of which are slotted at 66. A bellcrank lever is pivotally mounted in each of the slots, the lower end 67 of the bellcrank lever providing gripping fingers, which carry serrated grippers 68 loosely mounted on pins 68a. The upper end 69 of each bellcrank lever projects inwardly and has a rounded head 70 which extends into the groove of an operating spool 71. The operating spool is moved by shaft 72 which is actuated by air cylinder 73.

IV. SPRAY CARRIER

The spray heads, which are indicated generally at D in Fig. 1, are shown in greater detail at 74 in Figs. 4 and 13. These spray heads are of a well-known design available on the commercial market, and they will therefore not be described in detail. A fluid connection 75 supplies water or other coolant to the spray heads and a pair of air connections 76 and 77 supply operating air pressure.

In the preferred form illustrated four of the spray heads 74 are used. The spray heads 74 are carried by a spray carrier 78, supported and guided by guide rods 79 which reciprocate in bearings mounted on support frame 80. Spray carrier 78 is moved by push-rod 81 which is actuated by an air cylinder 82.

Each of the inside spray heads, 74c and 74b, is adjustably mounted on an extension of a guide rod 79 and each of the outside spray heads, 74a and 74d, is adjustably mounted on a stud shaft 83 carried by the cross head 78.

The air cylinder 82 is operated to move the spray carrier from its outer or inoperative position, shown in Fig. 4, to its inner spraying position, shown in Fig. 3. The operations of the machine are timed so that the spray heads reach the operating position of Fig. 3 after the castings have been removed and the cores have been reassembled and are ready for the next molding operation.

It will be clear from Fig. 13 that the spray heads 74a and 74b are directly angularly at opposite sides of the core of mold A. It has been found that the cooling effect supplied by spray 74b is important because it is directed at the part of the core which first contacts the hot metal and which therefore reaches a higher temperature than the rest of the core. It should be noted from Figs. 3 and 13 that the two spray heads 74a and 74b are spaced apart along an axis which is parallel to the planes of separation between the center core and the two side cores. This means that the spray from each of these spray heads is directed inwardly and downwardly at the narrow edges of the core members, this producing a maximum cooling effect on the center core, the one having least exposed area and therefore most difficult to cool.

In a similar way spray heads 74c and 74d cool the core members of mold B.

V. HYDRAULIC AND AIR DIAGRAMS

Fig. 14 is a hydraulic diagram which illustrates in a schematic way, the various hydraulic means for operating different parts of the machine. This figure also indicates the location of certain of the electrical switches in order to make clear their location and mode of operation in relation to the mechanical parts of the machine. Electrical connections to these switches are omitted and are indicated schematically in the electrical diagram, Fig. 17.

As shown in the hydraulic diagram, Fig. 14, a hydraulic valve 84 is provided to control flow of hydraulic fluid to the cylinders 22A and 23A which control the mold-halves of mold A.

Hydraulic valve 85 controls flow of hydraulic fluid to cylinders 50A and 50B which control the left-hand cores of molds A and B.

Hydraulic valve 86 controls flow of hydraulic fluid to the cylinders 51A and 51B which control the right-hand cores of molds A and B.

Hydraulic valve 87 controls flow of hydraulic fluid to the cylinders 22B and 23B which control the mold-halves of mold B.

Hydraulic valve 88 controls flow of hydraulic fluid to the cylinders 43A and 43B which control the center cores of molds A and B.

Hydraulic valve 89 controls flow of hydraulic fluid to the cylinder 62 which turns the extractor.

Hydraulic valve 90 controls flow of hydraulic fluid to the cylinder 61 which moves the extractor slide vertically.

Each of these hydraulic valves is connected to a pressure supply line 91, and to exhaust lines 92 and 93 as illustrated in Fig. 14.

The operation of these hydraulic valves in actuating their respective cylinders will be explained in detail later in connection with the sequential statement of operation of the machine.

Figure 15:
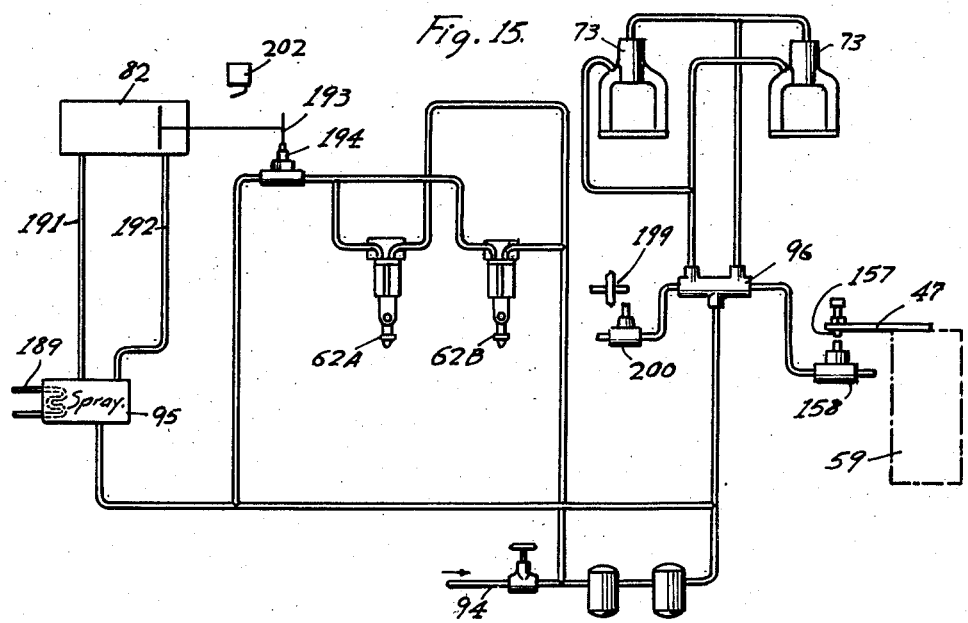
Fig. 15 is a diagram illustrating the air control system.

Fig. 15 is an air diagram which shows that the air supply line 94 supplies air to the valve 95, which controls supply of air to the cylinder 82 to reciprocate the spray heads. Supply line 94 also supplies air to the master valve 96 which controls operation of the gripping fingers of the extractor.

A detailed explanation of the devices shown in Fig. 15 will be made in connection with the sequential statement of operation of the machine.

Figure 16:
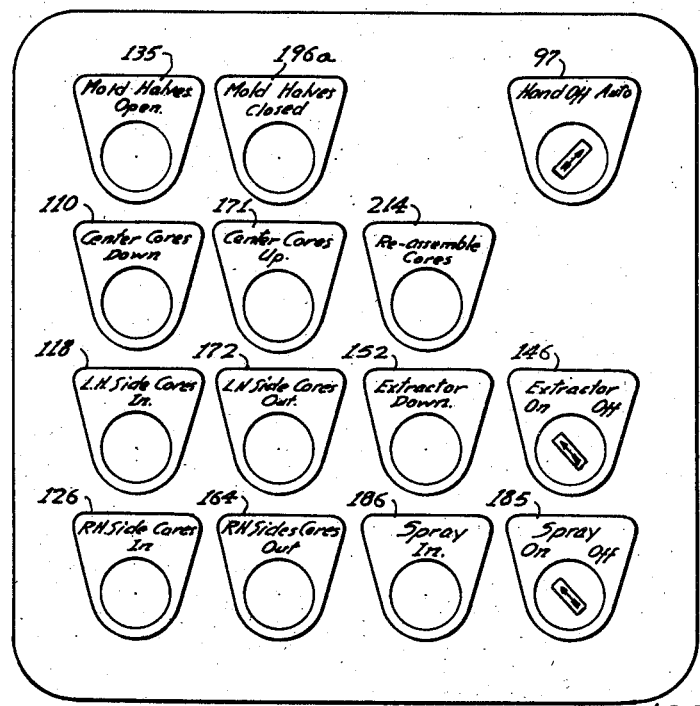
Fig. 16 is a diagram illustrating the main switch panel.

Fig. 16 is a diagram of the control panel illustrating the different switches which control the electric circuits and these also will be explained in detail with the sequential operation of the machine.

Figs. 17a and 17b together form a diagram showing the electrical circuits of the control devices.

VI. SEQUENCE OF OPERATIONS IN DETAIL

In the following statement of the operations of the machine, the letters A, B, etc. will represent operations performed by the operator. The numerals 1, 2, 3, etc. will represent operations performed by the machine.

It will be assumed at the start of operations that the molds are in the "closed" or molding position and are ready to receive molten metal, as illustrated in Fig. 1 and Fig. 6 of the drawing.

It is also assumed that the master selector switch 97 of Fig. 16 is turned to the "automatic" position. In this position the machine is not completely automatic but operates on what might be called a semi-automatic operation, since the automatic sequencing stops at one or more points in the cycle of operations.

A. OPERATOR POURS MOLTEN METAL INTO MOLDS A AND B

The operator uses a ladle having two lips which are spaced apart the same distance as the openings 18 in the head blocks (see Fig. 7). The operator fills this ladle with molten metal from a holding pot and pours it into the two adjacent pouring openings 18 to fill the two molds A and B simultaneously.

B. OPERATOR DEPRESSES CYCLE-START BUTTON 98

In the electrical diagram Fig. 17a, it will be seen that the two leads 99 and 100 supply current (100 v. 60 cycle) to the machine.

With the master selector switch 97 in the "Automatic" position, the operator depresses the Cycle-Start button 98 (on front of the machine, Fig. 1), and current is supplied to the universal-type relay 101.

Cycle-start button 98 makes only momentary contact, as it is spring returned. However, when relay 101 becomes energized it closes contacts 101a, which close a "lock-in" circuit as follows: from switch 97, through manual "Reassemble Cores" switch 214; through closed switches 159 and 160; and through contacts 101a to relay 101. This "lock-in" circuit keeps relay 101 energized until the happening of one of these two events:

(a) Contacts 159 and 160 are opened (when the gripping fingers grip both castings)
(b) Manual button 214 "Reassemble Cores" is pressed, thereby opening the circuit.

When relay 101 becomes energized it also moves the following contacts in the operating circuits:

Closes the normally-open contact 101b, which controls the Opening Cycle.
Opens the normally-closed contact 101c which controls the Closing Cycle.
Closes the Contact 101d, which controls current to the timing device 103.

Opening Cycle

During the Opening Cycle the mold halves open, the cores are collapsed to free the castings, and the extractor removes the complete castings from the machine.

With the contacts in the position just described, voltage is impressed from the master selector switch 97, through wire 107 and contact 101b to bus line 108.

1. Timer 103 times out

The timer 103 has been pre-set to provide a delay long enough to permit the metal in the molds to solidify before any of the mold parts move. When timer 103 times out it simultaneously closes contact 103a in line 134 and contact 103b in line 109.

2. Extractor arm rotates forward

Current now flows from bus 108, through wire 134, closed contact 103a, the lower closed contacts of manual switch 135 to wire 136, through switch 146 (which is in the "on" position) to solenoid winding 147.

As will be seen in Fig. 14 the solenoid winding 147 is the left-hand solenoid winding of the fluid control valve 89. When winding 147 is energized fluid control valve 89 is moved to its left-hand position and fluid pressure from supply line 91 is admitted through fluid line 148 to the blind end of the cylinder 62. At the same time fluid line 149 connects the rod end of cylinder 62 to the exhaust line 93. This operation causes the piston of cylinder 62 to move toward the right as viewed in Fig. 14. This movement of the piston (in Fig. 5, which shows the back of the machine, this movement is toward the left) causes the extractor arm to move from its rear or "discharging position" to its forward position over the mold cavities.

When the extractor arm reaches the limit of its movement and is positioned over the molds it closes a normally-open limit switch 150, shown in Fig. 5. This limit switch 150 is located in the circuit which moves the extractor down, so that the extractor is prevented from moving down until it reaches its correct position over the molds.

3. Mold halves open

Current now also flows from bus 108, through wire 134, through closed contact 103a, through the lower closed contacts of manual switch 135, and through wire 136 to the solenoid windings 137 and 138.

Solenoid winding 137 is the right-hand winding of the hydraulic control valve 84, and when winding 137 is energized to move the valve 84 to the right-hand side, fluid is admitted from the pressure line 91 to the lines 139 and 139a which supply fluid pressure to the rod ends a cylinders 22A and 23A. At the same time lines 140 and 140a, which lead from the blind ends of cylinders 22A and 23A, are connected to the exhaust line 93.

Solenoid winding 138 is the right-hand winding of the hydraulic control valve 87, and when winding 138 is energized to move the valve to its right-hand position, fluid is admitted from the supply line 91 to the lines 141 and 141a, which supply fluid under pressure to the rod ends of cylinders 22B and 23B. Simultaneously, fluid lines 142 and 142a, which lead from the blind ends of cylinders 22B and 23B respectively, are connected by fluid control valve 87 to the exhaust line 93. This movement of solenoids 137 and 138 causes the pistons of the mold half cylinders to move outwardly.

Since current is supplied simultaneously to the solenoid windings 137 and 138 it follows that the mold halves of both molds are caused to move outwardly simultaneously. As the mold halves move outwardly the core pins are also moved outwardly as previously explained.

It will be clear from Fig. 14 that when the piston of mold half cylinder 23A reaches the outer end of its travel it opens a normally-closed limit switch 143 which, as shown at the upper part of Fig. 17a is located in the circuit leading to the time delay device 103. This limit switch cooperates with switch 215 (described later) to de-energize the timer 103.

The rod of left-hand cylinder 22A of mold A, when it reaches the outward limit of its movement, closes a normally-open limit switch 144, and when the rod of cylinder 22B reaches the outer end of its movement it closes a normally-open limit switch 145. These two limit switches, 144 and 145, are located in the circuit which causes the extractor to move down, and hence the extractor cannot move down until the mold halves of both molds have reached the outer limit of their travel, thus preventing any interference of the mold halves with the downward movement of the extractor.

4. Center cores move down

It was previously noted that when timer 103 times out, contacts 103a and 103b are simultaneously closed. The closing of contact 103a caused the extractor arm to rotate forward and the mold halves to open, as has just been described. The closing of contact 103b causes the center cores to move down, as will now be explained.

When contact 103b is closed, current flows from bus 108 through wire 109, contact 103b, the lower closed contacts of manual switch 110, and through wire 111 to solenoid winding 112, which is the right-hand solenoid of hydraulic control valve 88.

When the solenoid winding 112 is energized it moves the operating parts of hydraulic valve 88 to the right, thereby causing fluid pressure from line 91 to be admitted to the lines 113 and 113a which connect to the rod ends of the cylinders 43B and 43A, respectively. Fluid lines 114 and 114a lead from blind ends of cylinders 43B and 43A, respectively, and these fluid lines are at this time connected through valve 88 with the exhaust line 93.

Hence, it will be seen that when the solenoid winding 112 moves hydraulic control valve 88 to the right the cylinders 43A and 43B move the center cores down out of the mold.

When the piston of cylinder 43A reaches the end of its downward travel a part attached to the piston rod contacts the arm of limit switch 115 closing this normally-open limit switch. (See Figs. 14 and 6.) Similarly, limit switch 116 (Fig. 14) is closed at the end of downward travel of the piston of cylinder 43B.

These limit switches, 115 and 116, are located in the circuit which moves the side cores, and the limit switches make sure that the center cores have been moved down before the side cores are collapsed inwardly toward each other.

5. Timer 103 is de-energized

Located in the same housing with normally-open limit switch 116 is a normally-closed limit switch 215, which is opened when the rod of cylinder 43B reaches the downward end of its travel. This open switch 215 cooperates with switch 143, which was opened by outward movement of Mold half cylinder 23A, to break the circuit leading to the timer 103, thus de-energizing the timer and permitting it to reset for another operation.

6. Left-hand side cores move in

At this time current flows (Fig. 17a) from bus line 108 to line 117 through the closed limit switches 115, 116, through the closed lower contact of manual switch 118 and through wire 119 to solenoid 120, which is the left-hand solenoid of hydraulic control valve 85. Energization of solenoid winding 120 moves the hydraulic control valve 85 to the left, permitting fluid pressure from supply line 91 to flow through lines 121 and 121a to the blind ends of cylinders 50A and 50B, thereby moving inwardly toward the center of the molds the two left-hand side cores.

At the end of inward movement of the left-hand side core of mold A the rod of cylinder 50A (see Fig. 14) contacts a limit switch 123, closing it. Similarly, inward movement of the rod of cylinder 50B of the left-hand side core of mold B closes limit switch 124.

7. Right-hand side cores move in

Referring now to Fig. 17a it will be clear that current can now flow from wire 117 through wire 125, through closed limit switches 123 and 124, through the closed lower contacts of the manual switch 126, through the wire 127 to the solenoid winding 128.

Solenoid winding 128 is the right-hand solenoid of fluid control valve 86 (see Fig. 14) and when fluid control valve 86 is moved to the right by solenoid 128, fluid is admitted from the pressure supply line 91 through lines 129 and 129a to the blind ends of cylinders 51A and 51B which control the right hand side cores. Fluid lines 130 and 130a, which lead from the rod ends of cylinders 51A and 51B are connected by valve 86 to the exhaust line 93. As a result of this movement of hydraulic control valve 86 the right-hand side cores are moved inwardly toward the center of the mold.

The presence of the limit switches 115 and 116 in the circuit for solenoid winding 128 insures that the right-hand side cores will not move unless both left-hand side cores have moved inwardly.

It will be seen from Fig. 14 that at the end of the inward movement of the right-hand core of mold A, limit switch 131 is closed by the piston rod of cylinder 51A and similarly at the end of inward movement of right-hand side core of mold B limit switch 132 is closed by operation of the piston rod of cylinder 51B. The closing of these two limit switches 131 and 132 helps to condition the circuit for downward movement of the extractor as will be subsequently explained.

Castings can now be extracted

At this point in the operation of the machine, the parts are in the following condition:

The extractor arm is in its position over the castings.

The mold halves have been opened and are at the outer extent of their movement.

The center cores are down out of the castings.

The left-hand and right-hand side cores have been moved together in the center of the casting so that the casting can be moved upwardly without interfering with projections on the side cores.

Each casting is standing in the base ring of the mold and is free to be moved in an upward direction.

If because of any mechanical or electrical failure all of the above operations have not been completed, then at least one of the limit switches has not been actuated and the circuit remains open so that all further automatic operation will cease and the operator can make manual corrections.

At this time it should be pointed out that when the molds are assembled in "closed" or molding position, the cavity which is to form the skirt of the piston projects partway down into the base ring 225 as indicated at 226. (See Fig. 6.) The parting line on the casting (see Fig. 11a) which marks the meeting of the mold half and the base ring 225 is indicated by reference numeral 227. As a result of this construction the casting is kept accurately in its casting position while the mold halves move away from the casting, and the side cores collapse inwardly toward each other.

8. Extractor arm moves down

Referring now to Fig. 17a, it will be seen that at this time the wire 151, which extends downwardly from wire 125, conducts current through limit switch 131, which was closed by inward movement of the right-hand side core cylinder 51A; through switch 132, which was closed by inward movement of right-hand side core cylinder 51B; through the "Extractor On" switch 146; through the closed lower contact of the manual switch 152; through the contact 144, which was closed by the outward movement of mold half cylinder 22A; and through switch 145, which was closed by outward movement of mold half cylinder 22B. The limit switch 150 in this circuit was closed when the extractor arm reached its correct extracting position over the casting. A circuit is now completed through solenoid winding 153.

Solenoid winding 153 is at the right end of hydraulic control valve 90. When winding 153 is energized and moves valve 90 to the right-hand position, fluid pressure is admitted from the supply line 91 to the rod end of cylinder 61. Simultaneously the fluid line 155 which leads from the blind end of cylinder 61 is connected by valve 90 with the exhaust line 93.

This operation of solenoid 153 causes the piston of cylinder 61 to move downward, moving downward the slide 59 which carries with it the extractor arm.

As previously explained the extractor arm 55 carries two extractor heads. Each of these heads, shown in detail in Figs. 11 and 12, is provided with a safety rod 154. As the extractor arm moves downwardly the safety rod 154 engages the top of the piston casting and as the extractor arm continues its downward movement rod 154 is pushed upwardly into contact with limit switch 155. The other extractor head similarly carries a rod 154 which engages a switch 156 similar to the switch 155. These two limit switches, 155 and 156, condition the circuit for closing the molds, as will be described later.

9. Gripping fingers grip the castings

As the extractor slide 59 nears the lower end of its travel a detent 157 carried by the extractor slide (see Figs. 5, 13 and 15) depresses the stem of a pilot valve 158. The pilot valve operates a master valve 96 which admits air pressure from air supply line 94 to the air cylinders 73 which operate the gripping fingers of the extractor heads.

Referring to Figs. 11 and 12 it will be seen that the upward movement of the pistons in cylinders 73 moves upwardly the spools 71 which operate the gripping fingers. As the spool 71, as illustrated in Fig. 12, reaches the upper limit of its travel, it opens a normally-closed limit switch 159. Similarly the operating spool 71 of the other extractor head at the upper limit of its travel opens a normally closed limit switch 160.

The two limit switches 159 and 160 are wired in parallel in the lock-in circuit leading to the universal type relay 101 and when they are both opened the solenoid in relay 101 becomes de-energized.

When relay 101 becomes de-energized it returns to its normal position, with the contact 101b, which controls the Opening Cycle of the molds, open; with the contact 101c, which controls the Closing Cycle of the molds, closed; and with contact 101d, which is a control on timer 103, open.

10. Extractor arm moves up

When contact 101b is opened, the current which was flowing to the solenoid winding 153 is interrupted. The de-energization of winding 153 permits the spring mechanism to return the fluid control valve 90 to the left-hand position in which fluid pressure is admitted through line 155 to the blind end of cylinder 61 and the extractor slide 59 is moved upwardly.

This upward movement of the extractor slide 59 causes the extractor arm to move upwardly away from the bed of the machine and the castings which have previously been gripped by the extractor heads are now moved upwardly away from the molds.

As the extractor slide 59 nears the upper limit of its movement it closes a normally-open limit switch 161, located in the electrical circuit which actuates further operations of the machine, as will be subsequently described.

At this point it should be noted that if either of the extractor heads fails to remove its casting from the base ring for any reason, no further automatic action of the machine will take place because one of the safety switches 155 or 156 will remain open. It is then necessary for the operator to remove the casting from the base ring and press upwardly the safety rod 154 of the extractor head which failed to operate, thus closing the associated safety switch.

Closing Cycle

During the Closing Cycle the cores are re-assembled, the sprays move out to spray the cores, and the extractor deposits the completed castings on the delivery chutes. Automatic operation ceases with the molds open.

The operator places struts on the cores and then presses a button to close the mold halves.

11. Right-hand side cores move out

In the present condition of the machine, the contact 101c is closed and current therefore is flowing (Fig. 17b) through wire 162 to wire 163; through closed contact 161, which was closed when the extractor slide reached the upper limit of its movement; through the closed switches 156 and 155, which were closed when the safety rods 154 were pushed upwardly by contact with the piston castings; through the lower closed contact of manual switch 164; and through wire 165 to solenoid winding 166.

The solenoid 166 is the left-hand solenoid of hydraulic control valve 86 and when it is energized it removes the hydraulic valve to its left-hand position in which pressure from supply line 91 is transmitted through the fluid lines 130 and 130a to the rod ends of the right-hand core cylinders 51A and 51B. At the same time fluid lines 129 and 129a which lead from the blind ends of cylinders 51A and 51B are connected by control valve 86 to the exhaust line 93.

As a result of this energization of solenoid 166 the right-hand side cores are moved outwardly away from the center of the machine to their position which permits completion of the core assemblies.

As the piston rod of cylinder 51A nears the end of its movement away from the center of the mold it closes a normally open limit switch 167. Similarly, the rod of cylinder 51b closes a limit switch 168.

The two limit switches 167 and 168 are located in the circuit which moves the left-hand cores out and insures that the left-hand cores cannot move until after the right-hand cores have completed their motion to the assembled position.

12. Left-hand side cores move out

Current now flows from wire 163 through limit switch 161 to wire 169; through wire 170 to the upper closed contacts of manual switch 171; through the closed limit switches 167 and 168, which were closed upon completion of the outward movement of the right-hand side cores; through the lower closed contact 171a, of manual switch 172; through an additional closed contact 171b of manual switch 171; through wire 173; to the solenoid winding 174.

Solenoid winding 174 is the right-hand solenoid of fluid control valve 85. When solenoid winding 174 is energized it moves fluid control valve 85 to its right-hand position, in which fluid pressure from supply line 91 is supplied through lines 122 and 122a to the rod ends of the left-hand side core cylinders 50A and 50B, causing the left-hand side cores to move outwardly away from the center of the core.

It will be clear from Fig. 14 that when the piston rod of cylinder 50A reaches the outer end of its movement it closes a normally opened limit switch 175. Similarly the piston rod of cylinder 50B closes a normally open limit switch 176. The two limit switches 175 and 176 are connected in the circuit which controls upward movement of the center core and these two limit switches insure that the center cores will not move upwardly until after both of the side cores have moved to their outer positions.

13. Center cores move up

Current now flows from wire 170, through upper closed contacts of manual switch 171, through closed limit switches 167 and 168 to wire 177; through limit switches 175 and 176, which were closed when the left-hand side cores reached the outward limit of their movement, and through wire 178 to solenoid winding 179.

Solenoid 179 is the left-hand winding of the fluid control valve 88 and it moves the fluid control valve to its left-hand position in which fluid under pressure is supplied from pressure line 91 through lines 114 and 114a to the blind ends of center core cylinders 43A and 43B. Simultaneously, the fluid lines 113 and 113a which lead from the rod ends of cylinders 43A and 43B are connected through valve 88 with the exhaust line 93.

The result of the energization of solenoid winding 179 is to move the center cores upwardly to their assembled positions between the right and left hand cores, forming a complete core assembly for each of the molds.

When the rod of center core cylinder 43B moves up it permits closing of switch 215, which helps to close the circuit to timer 103.

14. Extractor arm rotates back

When wire 178 supplied current to solenoid winding 179 which moved the center cores up, at the same time it supplied current to solenoid winding 180 which is wired in parallel with solenoid winding 179.

Solenoid winding 180 is the right-hand solenoid of hydraulic control valve 89 and when energized it moves valve 89 to its right-hand position in which fluid pressure is admitted from line 91 through line 149 to the rod end of cylinder 62. Simultaneously, fluid line 148 which leads from the blind end of cylinder 62 is connected by valve 89 with the exhaust line 93.

The result of the energization of solenoid 180 is that the extractor arm is rotated back to its discharging position at the rear of the machine. (See Fig. 1).

As the extractor arm rotated out to its position over the mold, when it had moved about 45° from its rear or discharging position, a cam 181 (see Fig. 5) carried by extractor shaft 56 opened a normally-closed limit switch 182. The limit switch 182 is located in the circuit for moving the spray carrier out over the molds and the opening of this limit switch by the extractor arm prevents outward movement of the spray carrier while the extractor arm is over the molds.

When the extractor arm moves back to its discharging position, limit switch 182 is permitted to close, thus energizing the circuit which moves the spray carrier 78 in to its cooling position over the cores.

15. Core assemblies are sprayed

The two side cores and the center core for each mold are now properly assembled to form a core assembly projecting upwardly from the base ring as shown in Fig. 3. The cores are still relatively hot from the last molding operation and at this point in the operation the spray heads apply a cooling spray of mixed air and water to the cores, as previously explained in detail.

At this time current flows from wire 183 to wire 184; through manual switch 185; through the lower closed contact of manual switch 186; through the limit switch 182, which was closed by operation of the extractor arm as just explained; and thence to time delay device 187. Simultaneously, current flows through closed contacts 188 to solenoid winding 189.

Solenoid winding 189 as shown in Fig. 15 is located at the left end of the air control valve 95. The energization of solenoid winding 189 causes the air control valve 95 to move toward the left, thus permitting air pressure from the air supply line 94 to pass through air line 191 to the blind end of the spray cylinder 82. Simultaneously, line 192, which leads from the rod end of spray cylinder 82 is connected by valve 195 to the atmosphere.

It is therefore seen that energization of solenoid 189 causes the piston rod of spray cylinder 82 to move toward the right as viewed in Fig. 15. This operation of the spray cylinder 82 moves the spray carrier 78 inwardly to its cooling position over the cores.

As shown in Fig. 4 a plate 193 is carried by the piston rod of cylinder 82 and as the spray carrier 78 nears the end of its inward travel, plate 193 depresses the operating stem of a three-way valve 194, which permits the flow of air and water to the spray heads.

As previously explained the spray heads now direct a cooling spray of air and water at the cores.

When limit switch 182 closed, current was supplied to spray timer 187, which may be pre-set to determine the spray time. When the timer 187 times out it opens contact 188, thus de-energizing solenoid winding 189. This permits a spring to return valve 95 to its right-hand position in which air pressure from supply line 94 is admitted through supply line 192 to the rod end of spray cylinder 82, thus moving the spray carrier 78 out to its inoperative position away from the molds.

When the piston of cylinder 82 begins to move out the plate 193 releases the stem of three wave valve 194, shutting off the spray.

Automatic operation ceases

If the machine is being used to mold pistons having steel struts, as previously explained, the machine will be set to stop its automatic operation at this point in and await further operations on the part of the operator.

C. OPERATOR PLACES STRUTS ON CORES

If the piston is to be provided with steel struts the operator now takes a pair of struts and locates them on the side cores of Mold A, and also places a pair on the side cores of Mold B.

D. OPERATOR DEPRESSES MOLD-CLOSE BUTTON 195

The operator now manually depresses "mold-close button" 195 which is located on the front of the machine as shown in Figs. 1 and 4.

16. Mold halves close

Referring to Fig. 17b it seems that current now flows from wire 183 to wire 196, through the lower closed contact of the manual switch 196a, through the "mold-close" button 195 which has been manually depressed, to the solenoid windings 197 and 198.

The solenoid winding 197 is the left-hand winding of hydraulic control valve 84, and when winding 197 is energized the control valve is moved to its left-hand position in which pressure is admitted from supply line 91 through lines 140 and 140a to the blind ends of the mold half cylinders 22A and 23B. Simultaneously, the lines 139 and 139a are connected with the exhaust line 93. It will thus be seen that energization of solenoid winding 197 causes the two mold halves of Mold A to move in and close to complete this mold.

Similarly, energization of solenoid 198 causes the two mold halves of Mold B to move inwardly to complete this mold.

When the rod of mold half cylinder 23A starts to move inwardly it releases switch 143, which helps to close the circuit to timer 103.

17. Circuit to timer 103 is conditioned for subsequent operation

Switch 215 was closed by operation No. 13 and switch 143 was closed by operation No. 16. The circuit to timer 103 is now conditioned to be completed when contact 101d is subsequently closed. (When Cycle-Start button 98 is depressed, see heading B above.)

18. Gripping fingers release castings

A piston rod which moves one of the mold halves of Mold B carries a cam 199 (see Fig. 15) which operates a pilot air valve 200 which causes master valve 96 to admit air pressure to the blind ends of the air cylinders 73 of the extractor heads. The resulting downward movement of the operating spools 71 cause the gripping fingers to release the castings onto any preferred type of chute or conveyor.

In the form of the invention illustrated (see Figs. 1, 2 and 3) a chute 201 is provided for each of the extractor heads. These chutes are positioned so that when the extractor arm moves to its rear or discharging position as illustrated in Fig. 1, the piston casting carried by an extractor head pushes against the row of castings previously deposited on the chute, pushing them farther along the chute. The pistons are thus progressively moved along by successive castings until they are finally discharged into a suitable bin or carrier.

In case a chute is provided the gripping fingers do not release the piston castings until after they have been placed over the chute.

Machine now ready to start another cycle

The parts are now all in "closed" or "molding" position, and the machine is now ready to accept the next charge of molten metal. The operator takes his ladle, goes to the holding pot and again pours metal simultaneously into molds A and B as explained under heading A above.

VII. SEQUENCE OF OPERATIONS
(SUMMARY)

A. Operator pours molten metal into molds A and B.
B. Operator depresses cycle-start button 98.

Opening cycle

1. Timer 103 times out to end a pre-selected period for metal to set. On completion of the pre-selected time interval, timer 103 closes contacts 103a and 103b. (Times operations Nos. 2, 3 and 4.)

Simultaneous:

2. Extractor arm rotates out. (Dependent on No. 1.) At 45° opens switch 182, which controls movement of spray carrier. At the end of movement, closes limit switch 150, which conditions the circuit for moving the extractor down. (Operation No. 8.)
3. Mold halves open. (Dependent on No. 1.) At end of movement, each mold half closes one of switches 144 and 145, which condition the circuit for moving the extractor down. (Operation No. 8.) At end of movement, one mold half opens switch 143, which co-operates with switch 215 to de-energize the timer. (Operation No. 5.)
4. Center cores move down. (Dependent on No. 1.) Each center core closes a switch, 115 and 116, which close the circuit for moving the left-hand side core in. (Operation No. 6.) One center core opens switch 215, which co-operates with switch 143 (opened by mold halves opening) to de-energize the timer 103. (Operation No. 5.)
5. Timer 103 is de-energized by the opening of switch 143 (Operation No. 3) and the opening of switch 215. (Operation No. 4.)
6. Left-hand side cores move in. (Dependent on No. 4.) Each left-hand side core closes a switch, 123 and 124, which close the circuit for moving the right-hand side cores in. (Operation No. 7.)
7. Right-hand side cores move in. (Dependent on Nos. 4 and 6.) Each right-hand side core closes a switch, 131 and 132, which help to close the circuit for moving the extractor arm down. (Operation No. 8.)
8. Extractor arm moves down. (Dependent on Nos. 2, 3, 4, 6 and 7.) If each of the preceding operations has been properly completed and the associated limit switch has been closed, the circuit is now completed for moving the extractor arm down. As the extractor arm moves down, a limit switch (155 and 156) is closed in each extractor head if the casting is properly contacted. These limit switches help to complete the circuit for subsequent operations. As the extractor arm moves down a detent 157 operates a pilot valve 158, which causes air to be admitted to the finger cylinders 73, closing the gripping fingers. (Operation No. 9.)
9. Gripping fingers grip the castings. (Dependent on No. 8.) Movement of the gripping mechanism opens switches 159 and 160, which break the circuit to relay 101, which becomes de-energized and (a) Opens contact 101a in the "lock in" circuit for relay 101.

(b) Opens contact 101b, breaking the circuit for the opening cycle.

(c) Closes contact 101c, closing the circuit for the closing cycle.

(d) Opens contact 101d in circuit to timer 103.

10. Extractor arm moves up. (Dependent on No. 9.) At end of movement, closes switch 161, which helps to close the circuit for the remaining operations.

Closing cycle

11. Right-hand side cores move out. (Dependent on Nos. 8 and 10.) Each right-hand side core closes a switch, 167 and 168, which complete the circuit which moves the left-hand side cores out. (Operation No. 12.)
12. Left-hand side cores move out. (Dependent on Nos. 10 and 11.) Each left-hand side core closes a switch, 175 and 176, which complete the circuit which moves the center cores up. (Operation No. 13.)

Simultaneous:

13. Center cores move up. (Dependent on Nos. 10, 11 and 12.) One of the center core rods, as it starts to move up, permits switch 215 to close, which helps to close the circuit to timer 103. (Operation No. 17.)
14. Extractor arm rotates back. (Dependent on Nos. 10, 11 and 12.) At 45° closes switch 182, which closes the circuit for the spray carrier. (Operation No. 15.)
15. Core assemblies are sprayed. (Dependent on Nos. 10, 11, 12 and 14.) Spray carrier 78 moves in over the molds. At end of movement operates spray valve 194. Timer 187, started by backward movement of extractor arm, determines the length of the spray period. Spray carrier 78 moves out to inoperative position.

Automatic operation ceases

C. Operator places struts on cores.
D. Operator depresses the mold-close button 195.

16. Mold halves close. (Dependent on Nos. 10, 11, 12 and D.) One of the mold-half rods, as it starts to move, permits switch 143 to close, which helps close the circuit to timer 103. (Operation No. 17.)
17. Circuit to timer 103 is conditioned for subsequent operation. Since switch 215 was closed by operation No. 13, and switch 143 was closed by operation No. 16, the circuit to timer 103 is now conditioned for subsequent operation. (When cycle-start button 98 is depressed and contact 101d closes.
18. Gripping fingers release the castings. (Dependent on No. 16.) One of the mold-half rods, as it starts to move, operates an air valve 200, which causes the gripping fingers to release the castings.

Machine now ready to start another cycle.

The molds are now in closed or "molding" position, and the machine is ready to start another cycle.

VIII. MANUAL CONTROL OF THE MACHINE

In the above description it has been pointed out that wherever a particular sequence of operation is important (that is, where a failure to follow that sequence would cause trouble) the controls are inter-locked in such a way as to prevent the particular operation from taking place unless the preceding operations have been completed in their proper sequence. The result is that in a case of any important mechanical or electrical failure the machine does not become jammed or injure itself, but merely ceases to operate. When the machine ceases to operate under these circumstances it is very easy from inspection to see how far the operation has proceeded and hence to locate very promptly the electrical circuits or mechanical parts where the failure has occurred.

The semi-automatic operation of the machine as described above takes place when the "master selector" switch 97 on the control panel is set at the "automatic" position.

When the switch 97 is set to the "hand" position, the lower contacts of switch 97 (see Fig. 17a) will be closed and the upper contacts will be open. When in this condition electric current is supplied from the supply wire 99 through switch 97 to bus wire 203 and the various parts of the machine can then be operated independently by the various manual buttons on the control panel. However, even in this case, certain of the controls are inter-locked so as to prevent improper movement of the parts that might jam or injure the mechanism.

Thus, beginning at the upper part of diagram 17a, it will be seen that when button 135 "mold halves open" is pressed, current flows from bus wire 203 to wire 204, through the upper contacts of switch 135 to wire 136, and to the extractor switch 146. If this switch is in the "on" position current flows to the solenoid winding 147 which causes the extractor arm to turn out over the molds. However, as extractor arm turns out it opens a normally-closed limit switch 182, as previously explained, which is in the circuit leading to the spray carrier mechanism and hence the spray carrier cannot be moved in over the molds while the extractor arm is over the molds.

Current from wire 136 flows simultaneously to solenoids 137 and 138, which cause the mold halves to open.

When the button 110, "center cores down," is pressed current flows from bus line 203 to wire 205, through the upper closed contacts of manual switch 110, to wire 111 and direct to solenoid 112, which moves the center core down.

When the manual switch 118 "L. H. side cores in" is pressed current flows from main bus wire 203, to wire 206, through the upper closed contacts of manual switch 118, to wire 119 and direct to solenoid 120, which moves the left-hand cores in.

When the manual button 126, "R. H. side cores in," is pressed current flows from main bus wire 203 through wire 207, through the upper closed contacts of switch 126 to wire 127, to solenoid winding 128, which moves the right-hand side cores in.

When manual button 152, "extractor down," is pressed current flows from bus wire 203 through wire 208, and through the upper closed contacts of manual switch 152. However, in this case current cannot continue on to the solenoid winding 153 which moves the extractor down, unless limit switches 144, 145 and 150 stand closed. The limit switches 144 and 145 are closed by the opening movement of the mold halves, and the limit switch 150 is closed when the extractor arm reaches its inward position over the center of the molds. Hence, the manual button 152 cannot move the extractor arm down unless the mold halves are open and the extractor arm is in proper position over the center of the mold cavities.

When the manual button 164, "R. H. side cores out," is pressed current flows from bus line 203 to wire 209, through the upper closed contacts of switch 164, through wire 165 to solenoid winding 166, which moves the right-hand side cores out.

When the manual button 172, "L. H. side cores out," is pressed current flows from bus line 203 through wire 210, through the upper closed contacts of manual switch 172, through wire 173 to the solenoid winding 174, which moves the left-hand side cores out.

When the manual button 171, "center cores up," is pressed current flows from main bus 203 through wire 211, and through the lower closed contact of switch 171. However, current cannot reach the wire 178 which supplies current to the solenoid winding 179, "center cores up," and to the solenoid winding 180, "extractor arm returns back," unless current can flow through the limit switches 167, 168, 175 and 176. Limit switches 167 and 168 are closed upon completion of the outward movement of the right-hand side cores, and limit switches 175 and 176 are closed upon completion of the outward movement of the left-hand side cores. If all of these side cores are in their outer positions, then current flows from switch 171 through limit switches 167, 168, 175, 176 to wire 178, to solenoid 179, which moves the center cores up.

Simultaneously, current is supplied from wire 178 to solenoid 180, which moves the extractor arm back to its discharging position.

When button 186, "spray in," is pressed, current flows from bus wire 203 to wire 212, and through the upper closed contacts of switch 186, but current cannot flow to the solenoid winding 189, which moves the spray carrier in, unless the limit switch 182 is closed. Limit switch 182 is closed when the extractor arm moves back to its discharging position, thus insuring that the spray carrier will not move in into the position over the castings when the extractor arm is in position over the castings. If the extractor arm is in its rear discharging position then current flows from switch 186 through the closed contacts of limit switch 182 through closed contacts 188 of the time delay device, and thence to the solenoid 189, which moves the spray carrier in over the molds.

When the button 196a, "mold halves close," is pressed, current flows from bus 203, through wire 213, through the upper closed contacts of switch 196a, and directly to the solenoids 197 and 198, which close the mold halves.

It should be noted that the "mold close" button on the front of the machine is operative only if the master selector switch 97 is set at "automatic." The button 196a "mold halves close" on the control panel is operative only if the master selector switch 97 is set at "Hand."

When the "extractor" switch 146 is at the "on" position the closing movement of the gripping fingers will open switches 159 and 160, de-energizing relay 101 and restoring it to its normal position, thereby automatically starting the closing cycle.

But if the "extractor" switch 146 is at the "off" position to permit manual removal of the castings, the switches 159 and 160 will not be opened by the gripping fingers, and it is therefore necessary to depress the manual button 214, "Reassemble Cores," which breaks the circuit to relay 101, thereby causing contact 101c to close and starting the closing cycle.

IX. MODIFICATIONS

It will be understood that various changes may be made in the structure disclosed above.

The machine may be built with a single mold, or with more than two molds, although the use of two molds is presently preferred.

If it is desired to move the center core after a time interval different from the one used for the mold halves, two separate timers may be substituted for the single timer 103.

In case the pistons to be cast in the machine are not to contain steel struts, a variation can be made in the structure of the machine. To understand this variation we should go back to the end of the operation No. 15 entitled, "Core Assemblies are Sprayed."

A normally-open limit switch 202 (see Fig. 15) can be disposed so that it will be closed by the outward movement of the spray carrier. This limit switch 202 would be wired in parallel with the manual "mold-close" button 195 at the bottom of Fig. 17b so that when switch 202 is closed current would be supplied from wire 196 to the solenoids 197 and 198 which cause the mold halves to close.

With the limit switch 202 installed the machine would operate automatically from the time the operator depresses the "cycle-start" button 98 until the machine has discharged the finished castings and was ready to receive another charge of molten metal. At this point the machine would stop until the operator pours a new charge of metal and then manually re-starts the machine by pressing the "cycle-start" button 98.

This stoppage of the machine to give the operator time to pour a fresh charge of metal takes place regardless of whether the pause for insertion of struts is provided. By making this complete stop and re-start at the molding operation the machine is made flexible and adaptable to the pace of the individual molder. This feature also permits the machine to accommodate itself to unavoidable delays on the part of the operator.

X. CONCLUSION

Attention is called to the fact that in the preferred form of the machine, after the operator presses the cycle-start button 98, the machine will automatically time a cooling period for the castings, open the molds, remove the castings, and spray the cores. Hence the operator has nothing to do with the machine until the molds are in open position ready to receive struts. It is therefore preferred practice to place two of the machines adjacent to each other, so that the operator can, from a single station, place struts and pour metal into the molds of the second machine while the first machine is carrying out its automatic sequence. In this way one operator can easily handle four molds, two on each machine, by alternating his manual operations from one machine to the other. Operating two of these machines in this manner a single operator has produced 2,442 piston castings in a day of 7½ working hours.

In attending two machines the operator normally performs the manual operations in the following sequence:

He turns to the machine which is ready to have struts placed on the cores (end of operation No. 15) and performs on this machine the following operations:

C. Operator places struts on cores.
D. Operator depresses the mold-close button 195.

He then picks up his ladle, fills it with molten metal, and performs the following operations:

A. Operator pours molten metal into molds A and B.
B. Operator depresses cycle-start button 98.

He then leaves the first machine, and turns to the second machine, which has now reached the end of operation No. 15, and performs the same sequence of manual operations on it.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A molding machine of the type having at least one mold of the permanent type with two mold halves which are movable toward each other to define a mold cavity and movable away from each other to expose the casting, the improvement which comprises; a pair of vertical guideways mounted on the rear of the machine, a slide movable vertically in the guideways, first power means for moving the slide vertically, a vertical shaft mounted rotatably on the slide, second power means for rotating the shaft, an extractor arm mounted on the shaft and movable by the first power means from a lowered position adjacent a casting to a raised position in which it clears the mold halves, the extractor arm being rotatable by the second power means from a position directly over the mold to a discharging position at the rear of the machine.

2. A machine as set forth in claim 1 in which the extractor arm carries pivotally mounted gripping fingers adapted to grip the casting, and a fluid cylinder for moving the gripping fingers.

3. A molding machine of the type having a table, a pair of molds of the permanent type mounted side by side on an axis extending cross-wise of the table, each mold having two mold halves which are movable toward each other to define a mold cavity and movable away from each other to expose the casting, the improvement which comprises; a vertically movable slide mounted on the table, first power means for moving the slide vertically, a vertical shaft mounted rotatably on the slide, second power means for rotating the shaft, an extractor arm keyed to the shaft and carrying a pair of extractor heads, the extractor arm being movable by the first power means from a lowered extracting position in which one of the extractor heads is located above each of the castings, to a raised position in which the castings clear the mold halves, the extractor arm being rotatable by the second power means from a position directly over the molds to a discharging position at the rear of the machine, a pair of chutes mounted stationarily at the rear of the machine and spaced so that a chute is directly under each extractor head when the extractor arm is in discharging position, each extractor head being provided with gripping members, and operating means to operate the gripping members, the operating means causing the gripping members to grip the castings when the extractor arm is in extracting position over the castings, and to release the castings when the extractor arm is in discharging position over the chutes.

4. A machine as set forth in claim 3 in which screw means is provided to adjust the angular position of the extractor arm relative to its supporting shaft to accurately aline the extractor heads over the castings.

5. In a molding machine having at least one mold of the permanent type with a metal core assembly consisting of a center core extending the full width of the core assembly and a side core located on each side of the center core, the improvement which comprises; a spray carrier mounted on the machine and movable to a spraying position over the core assembly, a pair of spray heads mounted on the spray carrier, the spray heads being spaced apart on opposite sides of the core assembly on an axis which is parallel to the lines of separation between the center core and the side cores, each spray head pointing downwardly and inwardly toward the core assembly, whereby the spray heads direct a cooling spray at each end face of the center core.

References Cited in the file of this patent

UNITED STATES PATENTS

| Number | Name | Date |
|---|---|---|
| 744,970 | Miller | Nov. 24, 1903 |
| 1,019,905 | McKee et al. | Mar. 12, 1912 |
| 1,120,539 | Rigby | Dec. 8, 1914 |
| 1,570,658 | Wickland et al. | Jan. 26, 1926 |
| 1,717,643 | Williams | June 18, 1929 |
| 1,756,602 | Morris et al. | Apr. 29, 1930 |
| 1,895,824 | Stenhouse | Jan. 31, 1933 |
| 1,935,739 | Freese | Nov. 21, 1933 |
| 1,974,837 | Shillinger et al. | Sept. 25, 1934 |
| 2,068,420 | Lockwood | Jan. 17, 1937 |
| 2,097,130 | Miller | Oct. 26, 1937 |
| 2,145,956 | Stern | Feb. 7, 1939 |
| 2,190,496 | Wagner | Feb. 13, 1940 |
| 2,459,892 | Palmer | Jan. 25, 1949 |
| 2,519,739 | Butner | Aug. 22, 1950 |
| 2,581,418 | Kohl | Jan. 8, 1952 |

OTHER REFERENCES

Pages 77 to 80, inclusive, The Iron Age, December 5, 1946.